(12) United States Patent
Ikegaya et al.

(10) Patent No.: US 11,091,242 B2
(45) Date of Patent: Aug. 17, 2021

(54) OUTBOARD MOTOR AND METHOD OF MANUFACTURING SHAFT FOR OUTBOARD MOTOR

(71) Applicant: YAMAHA HATSUDOKI KABUSHIKI KAISHA, Iwata (JP)

(72) Inventors: Yuki Ikegaya, Shizuoka (JP); Kenji Yukishima, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 110 days.

(21) Appl. No.: 16/574,204

(22) Filed: Sep. 18, 2019

(65) Prior Publication Data

US 2020/0130801 A1  Apr. 30, 2020

(30) Foreign Application Priority Data

Oct. 26, 2018  (JP) .............. JP2018-201505

(51) Int. Cl.
*B63H 20/14* (2006.01)
*B23F 5/22* (2006.01)

(52) U.S. Cl.
CPC .............. *B63H 20/14* (2013.01); *B23F 5/22* (2013.01)

(58) Field of Classification Search
CPC ................................. B63H 20/14; B23F 5/22
See application file for complete search history.

(56) References Cited

U.S. PATENT DOCUMENTS 2,780,146 A * 2/1957 Saari .................... B23F 5/22
                                                          409/31
6,814,635 B1 * 11/2004 Okabe ............... B63H 20/14
                                                          440/83
8,545,125 B2 * 10/2013 Brown ................. F16D 1/101
                                                          403/359.1

FOREIGN PATENT DOCUMENTS

JP        2003-214162 A    7/2003

* cited by examiner

*Primary Examiner* — Stephen P Avila
(74) *Attorney, Agent, or Firm* — Keating and Bennett, LLP (57) ABSTRACT

An outboard motor includes a shaft including a second spline that upwardly extends from a housing. The second spline is meshed with a first spline disposed inside either an engine cowl or an upper housing. The second spline includes a distal end and a body. The distal end is provided on an upper end of the shaft. The body is provided below the distal end. In the second spline, a groove width in the circumferential direction at the distal end is larger than a groove width in the circumferential direction at the body.

15 Claims, 8 Drawing Sheets

OUTBOARD MOTOR AND METHOD OF MANUFACTURING SHAFT FOR OUTBOARD MOTOR

CROSS REFERENCE TO RELATED APPLICATIONS

This application claims the benefit of priority to Japanese Patent Application No. 2018-201505 filed on Oct. 26, 2018. The entire contents of this application are hereby incorporated herein by reference.

BACKGROUND OF THE INVENTION

1. Field of the Invention

The present invention relates to an outboard motor and a method of manufacturing a shaft for the outboard motor.

2. Description of the Related Art

As described in Japanese Patent Application Publication No. 2003-214162, an outboard motor includes an engine, an engine cowl, an upper housing and a lower housing. The engine cowl accommodates the engine. The upper housing is disposed below the engine cowl. The lower housing is disposed below the upper housing. Additionally, the outboard motor includes a shaft (a shift shaft, a drive shaft, etc.). The shaft upwardly extends from the lower housing. A first spline is disposed inside the engine cowl or the upper housing. The shaft is provided with a second spline, meshed with the first spline, on the upper end thereof.

In some outboard motors, when assembled, the lower housing is attached to the upper housing. In a condition that the lower housing is detached from the upper housing, the shaft upwardly extends from the lower housing while being assembled to the lower housing. An assembly worker inserts the upper end of the shaft into the upper housing by moving the lower housing. The assembly worker then meshes the first spline and the second spline with each other, and simultaneously, attaches the lower housing to the upper housing.

However, when the first spline and the second spline are misaligned in position, it is difficult to mesh the second spline with the first spline. This makes it difficult to attach the lower housing to the upper housing. Especially, in attaching the lower housing to the upper housing while the outboard motor is horizontally set or is greatly tilted, chances are that the shaft is inevitably rotated in tilting the lower housing even when the first spline and the second spline are preliminarily aligned in position. In this case, the first spline and the second spline are inevitably misaligned in position, and this makes it difficult to attach the lower housing to the upper housing.

SUMMARY OF THE INVENTION

Preferred embodiments of the present invention provide outboard motors in each of which it is easy to attach a lower housing to an upper housing.

According to a preferred embodiment of the present invention, an outboard motor includes an engine, an engine cowl, an upper housing, a first spline, a lower housing, and a shaft. The engine cowl accommodates the engine. The upper housing is disposed below the engine cowl. The first spline is disposed inside the engine cowl or the upper housing. The lower housing is disposed below the upper housing. The shaft upwardly extends from the lower housing, and includes a second spline meshed with the first spline. The second spline includes a distal end and a body. The distal end is provided on an upper end of the shaft. The body is provided below the distal end. In the second spline, a width of the grooves in a circumferential direction at the distal end is larger than the width of the grooves in the circumferential direction at the body.

According to a preferred embodiment of the present invention, an outboard motor includes an engine, an engine cowl, an upper housing, a first spline, a lower housing, and a shaft. The engine cowl accommodates the engine. The upper housing is disposed below the engine cowl. The first spline is disposed inside the engine cowl or the upper housing. The lower housing is disposed below the upper housing. The shaft upwardly extends from the lower housing, and includes a second spline meshed with the first spline. The second spline includes a distal end and a body. The distal end is provided on an upper end of the shaft. The body is provided below the distal end. A root diameter of the second spline at the distal end is smaller than a root diameter of the second spline at the body.

According to a preferred embodiment of the present invention, a method of manufacturing a shaft for an outboard motor includes the following steps. A first step includes performing a first process of forming grooves in a spline by cutting the shaft in a predetermined first range from an end portion of the shaft in a direction of an axis of the shaft. A second step includes performing a second process. In the second process, the shaft is cut along a predetermined second range from the end portion of the shaft in the direction of the axis of the shaft such that a width of the grooves of the spline is larger in a circumferential direction of the shaft in the second process than in the first process. The predetermined second range is smaller than the predetermined first range.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
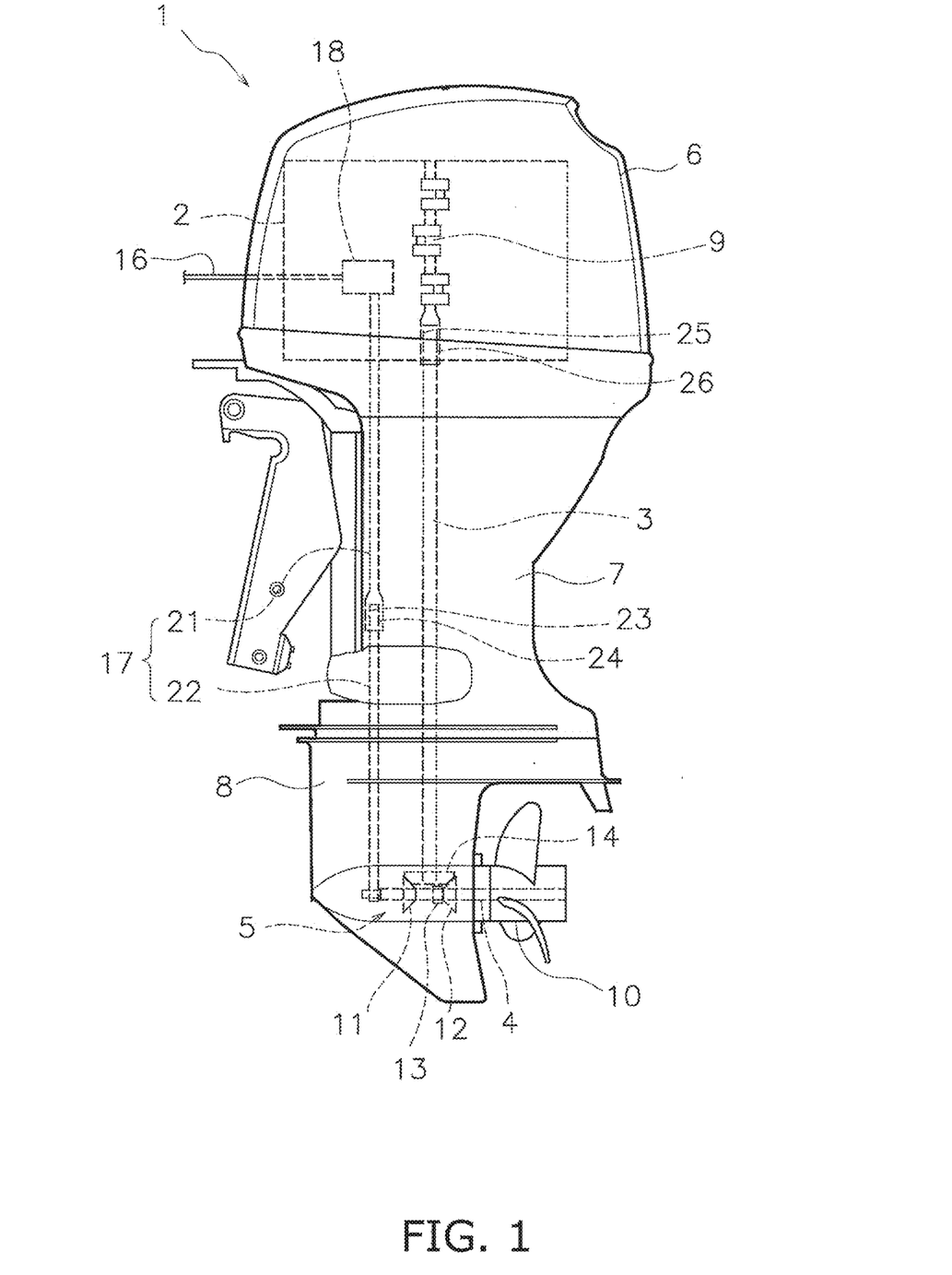
FIG. 1 is a side view of an outboard motor according to a preferred embodiment of the present invention.

Preferred embodiments of the present invention will be hereinafter explained with reference to drawings. FIG. 1 is a side view of an outboard motor 1 according to a preferred embodiment of the present invention. As shown in FIG. 1, the outboard motor 1 includes an engine 2, a driveshaft 3, a propeller shaft 4, a shift mechanism 5, an engine cowl 6, an upper housing 7, and a lower housing 8. It should be noted that in the following explanation, front, rear, left, right, up, and down directions are defined as referring to the front, rear, left, right, up, and down directions of the outboard motor 1, respectively.

The engine 2 generates a thrust to propel the watercraft 1. The engine 2 is disposed inside the engine cowl 6. The engine 2 includes a crankshaft 9. The crankshaft 9 extends in the vertical direction. The driveshaft 3 is provided separately from the crankshaft 9. The driveshaft 3 is connected to the crankshaft 9. The driveshaft 3 downwardly extends from the engine 2. The propeller shaft 4 extends in a direction intersecting with the driveshaft 3. The propeller shaft 4 extends in the back-and-forth direction. The propeller shaft 4 is connected to the driveshaft 3 through the shift mechanism 5. A propeller 10 is connected to the propeller shaft 4.

The upper housing 7 is disposed below the engine cowl 6. The lower housing 8 is disposed below the upper housing 7. The lower housing 8 is provided separately from the upper housing 7. The driveshaft 3 is disposed inside the upper housing 7 and the lower housing 8. The propeller shaft 4 and the shift mechanism 5 are disposed inside the lower housing 8.

The shift mechanism 5 switches the rotational direction of power to be transmitted from the driveshaft 3 to the propeller shaft 4. The shift mechanism 5 includes a plurality of gears and a clutch that changes meshing of gears. For example, the shift mechanism 5 includes a forward moving gear 11, a rearward moving gear 12, and a clutch 13. The forward moving gear 11 and the rearward moving gear 12 are meshed with a bevel gear 14 attached to the driveshaft 3. The clutch 13 selectively causes either the forward moving gear 11 or the rearward moving gear 12 to be engaged with the propeller shaft 4. The clutch 13 is movable to a forward moving position, a rearward moving position, and a neutral position.

When set in the forward moving position, the clutch 13 causes the forward moving gear 11 to be engaged with the propeller shaft 4. Accordingly, the rotation of the driveshaft 3 is transmitted to the propeller shaft 4 so as to rotate the propeller shaft 4 in a forward moving direction. When set in the rearward moving position, the clutch 13 causes the rearward moving gear 12 to be engaged with the propeller shaft 4. Accordingly, the rotation of the driveshaft 3 is transmitted to the propeller shaft 4 so as to rotate the propeller shaft 4 in a rearward moving direction. When set in the neutral position, the clutch 13 causes both the forward moving gear 11 and the rearward moving gear 12 to be disengaged from the propeller shaft 4.

The outboard motor 1 includes a shift member 17 and a shift actuator 18. The shift member 17 is connected to the shift mechanism 5, and is configured to actuate the shift mechanism 5. More specifically, the shift member 17 is connected to the clutch 13. When driven by the shift actuator 18, the shift member 17 moves the clutch 13 to one of the forward moving position, the rearward moving position, and the neutral position. The shift member 17 includes a shaft. When the shift member 17 is rotated in a predetermined direction about the axis thereof, the clutch 13 is moved from the forward moving position to the rearward moving position via the neutral position. When the shift member 17 is rotated reversely to the predetermined direction, the clutch 13 is moved from the rearward moving position to the forward moving position via the neutral position.

The shift actuator 18 is connected to the shift member 17 and drives the shift member 17. The shift actuator 18 includes, for instance, an electric motor. The shift actuator 18 drives the shift member 17 so as to switch the clutch 13 to one of the forward moving position, the rearward moving position, and the neutral position. The shift actuator 18 is connected to a shift operating tool (not shown in the drawings) through a communication line 16. The shift operating tool includes, for instance, a lever. The shift operating tool is movable among a forward moving position, a neutral position, and a rearward moving position. The shift operating tool outputs an electric signal corresponding to the position thereof. The shift actuator 18 drives the shift member 17 in accordance with the electric signal outputted thereto from the shift operating tool. It should be noted that the shift member 17 may be connected to the shift operating tool through a shift cable. The shift member 17 may be driven by the motion of the shift cable pulled or pushed in accordance with operating the shift operating tool.

The shift member 17 includes a first shaft 21 and a second shaft 22. The first shaft 21 and the second shaft 22 are provided separately from each other. The first shaft 21 is connected to the shift actuator 18. The second shaft 22 is connected to the shift mechanism 5. The first shaft 21 and the second shaft 22 are spline-coupled to each other. More specifically, the first shaft 21 includes a first spline 23. The first spline 23 is provided in a lower end portion of the first shaft 21. The first shaft 21 includes a hole provided in the lower end of the first shaft 21, and the first spline 23 is provided on the inner peripheral surface of the hole. The first spline 23 is disposed inside the upper housing 7. However, the first spline 23 may be disposed inside the engine cowl 6.

The second shaft 22 includes a second spline 24. The second spline 24 is provided on an upper end portion of the second shaft 22. The second spline 24 is provided on the outer peripheral surface of the second shaft 22. The upper end portion of the second shaft 22 is inserted into the hole provided in the lower end of the first shaft 21. The first spline 23 and the second spline 24 are meshed with each other such that the first shaft 21 and the second shaft 22 are coupled to each other.

The crankshaft 9 includes a third spline 25. The third spline 25 is provided in a lower end portion of the crankshaft 9. The crankshaft 9 includes a hole provided in the lower end of the crankshaft 9, and the third spline 25 is provided on the inner peripheral surface of the hole. The third spline 25 is disposed inside the engine cowl 6. However, the third spline 25 may be disposed inside the upper housing 7.

The driveshaft 3 includes a fourth spline 26. The fourth spline 26 is provided on an upper end portion of the driveshaft 3. The fourth spline 26 is provided on the outer peripheral surface of the driveshaft 3. The upper end portion of the driveshaft 3 is inserted into the hole provided in the lower end of the crankshaft 9. The third spline 25 and the fourth spline 26 are meshed with each other such that the crankshaft 9 and the driveshaft 3 are coupled to each other.

Figure 2:
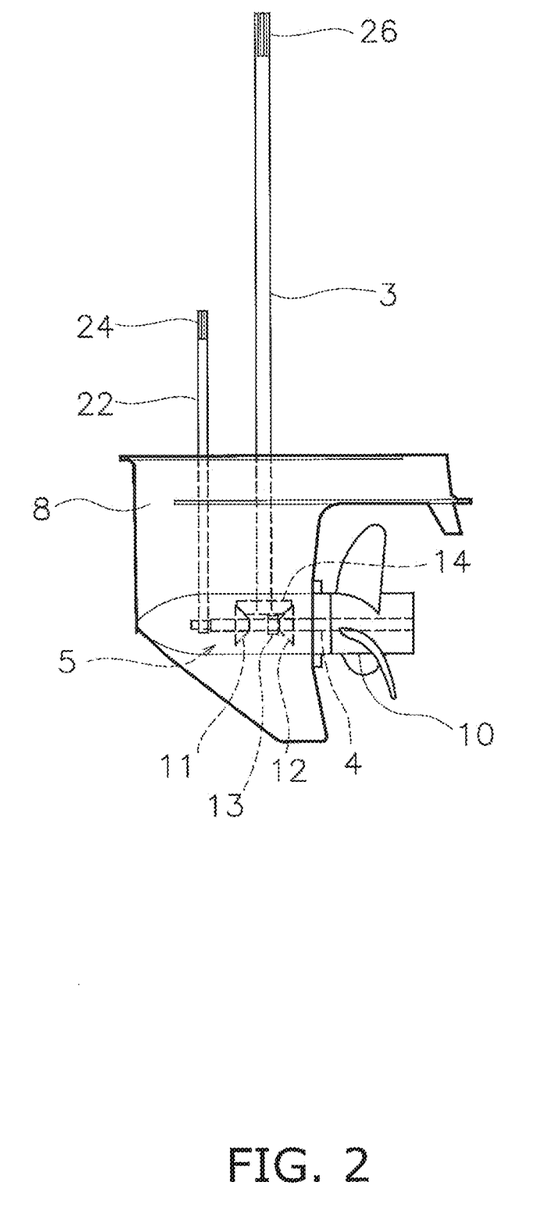
FIG. 2 is a side view of a lower housing detached from an upper housing.

FIG. 2 is a side view of the lower housing 8 detached from the upper housing 7. As shown in FIG. 2, the driveshaft 3 and the second shaft 22 upwardly extend from the upper surface of the lower housing 8. The upper end of the second shaft 22 is located below the upper end of the driveshaft 3. The second spline 24 of the second shaft 22 is located below the fourth spline 26 of the driveshaft 3. A fitting length (axial length) of the second spline 24 is smaller than a fitting length (axial length) of the fourth spline 26 on the driveshaft 3.

Figure 3:
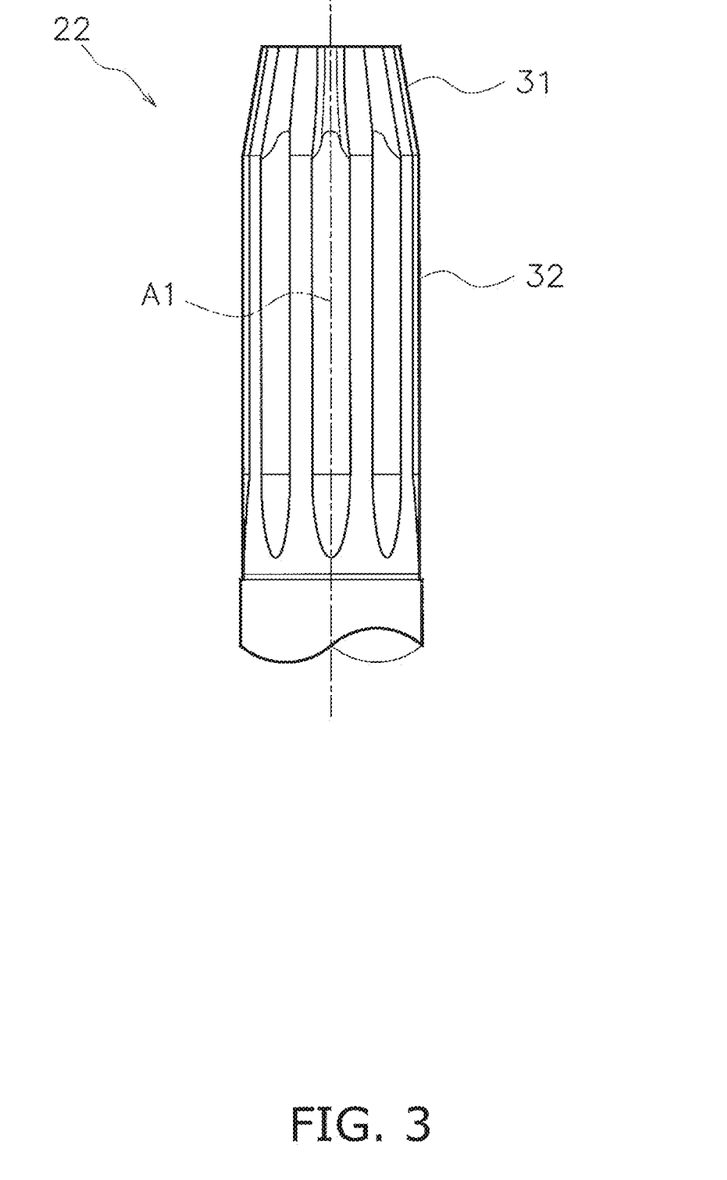
FIG. 3 is a side view of an upper end of a second shaft.
Figure 4:
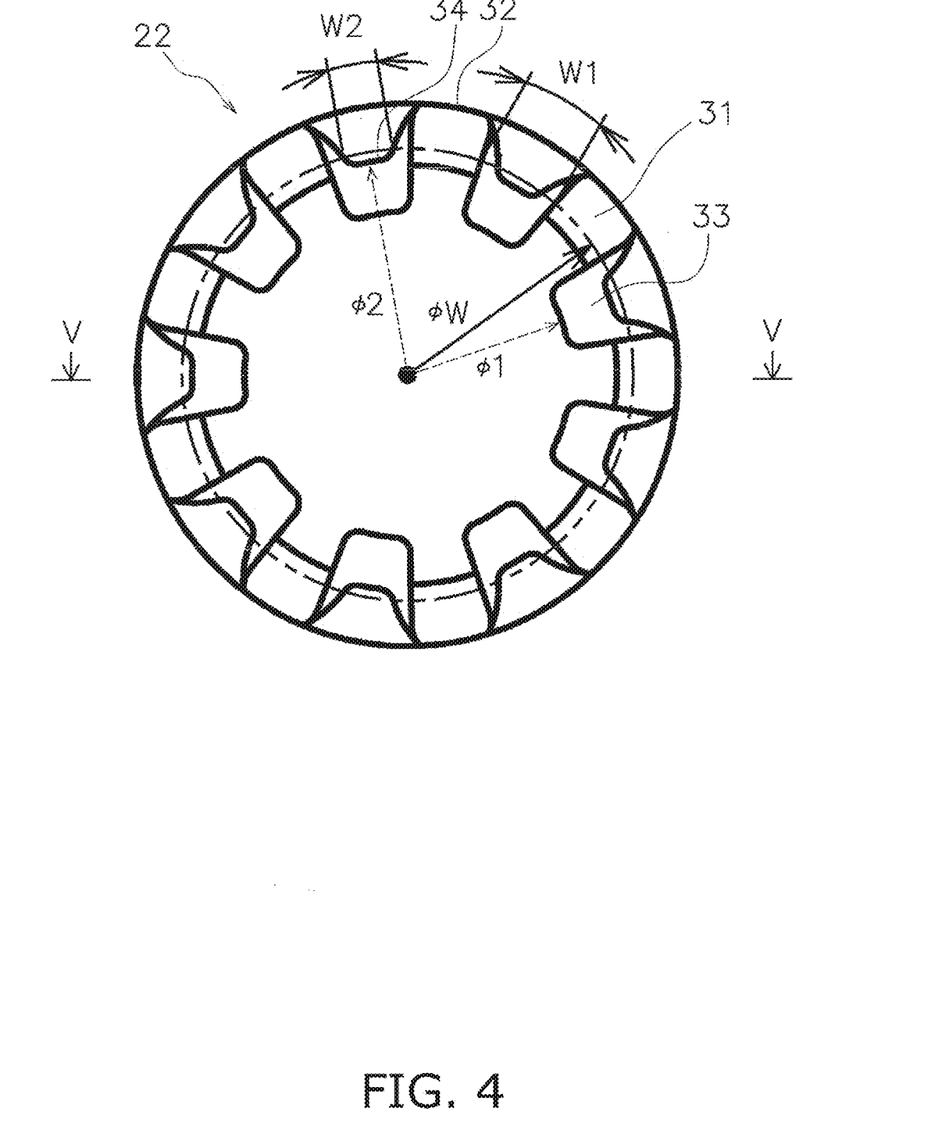
FIG. 4 is a top view of the upper end of the second shaft.
Figure 5:
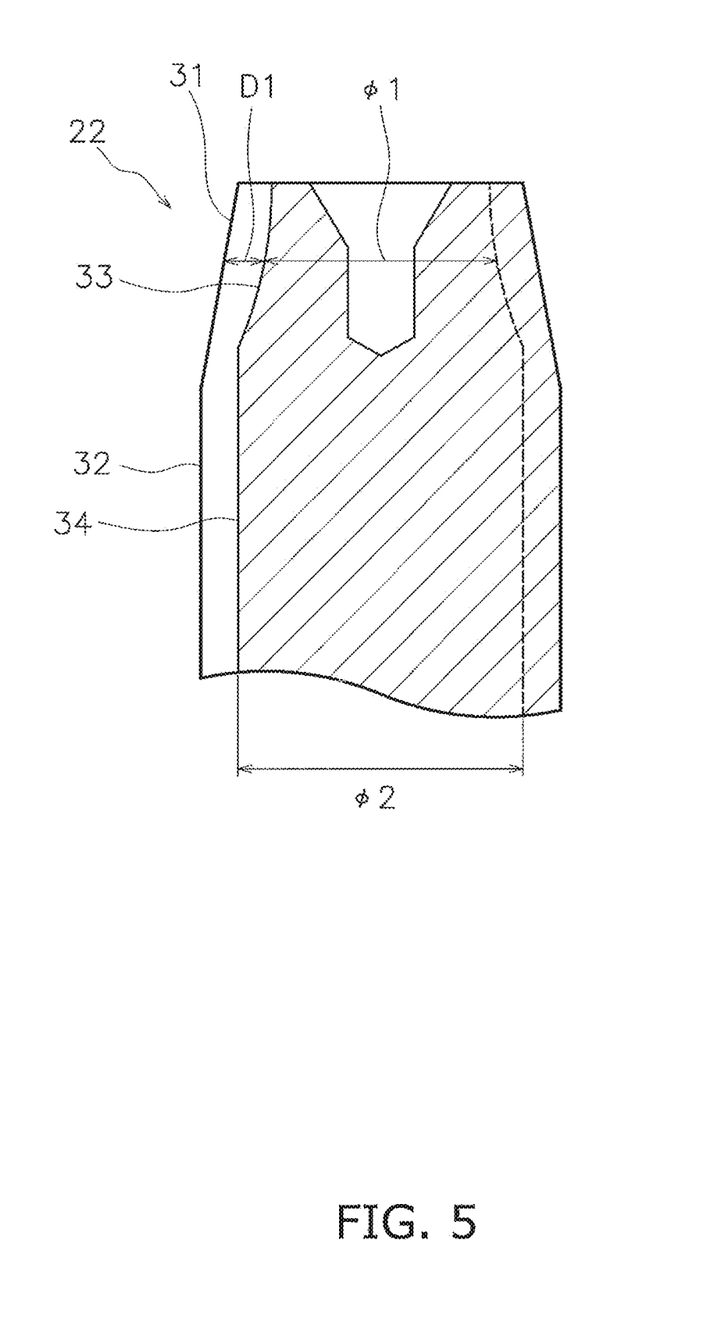
FIG. 5 is a cross-sectional view of FIG. 4 taken along line V-V.

FIG. 3 is a side view of the upper end portion of the second shaft 22. FIG. 4 is a top view of the upper end portion of the second shaft 22. FIG. 5 is a cross-sectional view of FIG. 4 taken along line V-V. As shown in FIG. 3, the second spline 24 includes a distal end 31 and a body 32. The distal end 31 is provided on the upper end of the second shaft 22. The body 32 is provided below the distal end 31. The distal end 31 is shorter than the body 32 in a direction of an axis A1 of the second shaft 22. The distal end 31 preferably has a shape that is tapered toward the upper end of the second shaft 22.

As shown in FIG. 4, in the second spline 24, a circumferential width W1 of each groove 33 provided on the distal end 31 is larger than a circumferential width W2 of each groove 34 provided on the body 32. Preferably, in the second spline 24, the circumferential width W1 of each groove 33 provided on the distal end 31 is larger than the circumferential width W2 of each groove 34 provided on the body 32 by about 10% or greater. More preferably, in the second spline 24, the circumferential width W1 of each groove 33 provided on the distal end 31 is larger than the circumferential width W2 of each groove 34 provided on the body 32 by about 25% or greater. It should be noted that the both terms herein described, "the circumferential width W1 of each groove 33" and "the circumferential width W2 of each groove 34", are defined as meaning widths on a pitch circle $\varphi W$ of the spline on the body 32, respectively, and W1 is set as the maximum value of the circumferential width.

As shown in FIG. 5, a radial depth D1 of each groove 33 provided on the distal end 31 decreases as the groove 33 extends downwardly from the upper end of the second shaft 22. In other words, in the second spline 24, a root diameter $\varphi 1$ of each groove 33 provided on the distal end 31 increases as the groove 33 extends downwardly from the upper end of the second shaft 22. In the second spline 24, the root diameter $\varphi 1$ of each groove 33 provided on the distal end 31 is smaller than a root diameter $\varphi 2$ of each groove 34 provided on the body 32.

Figure 6:
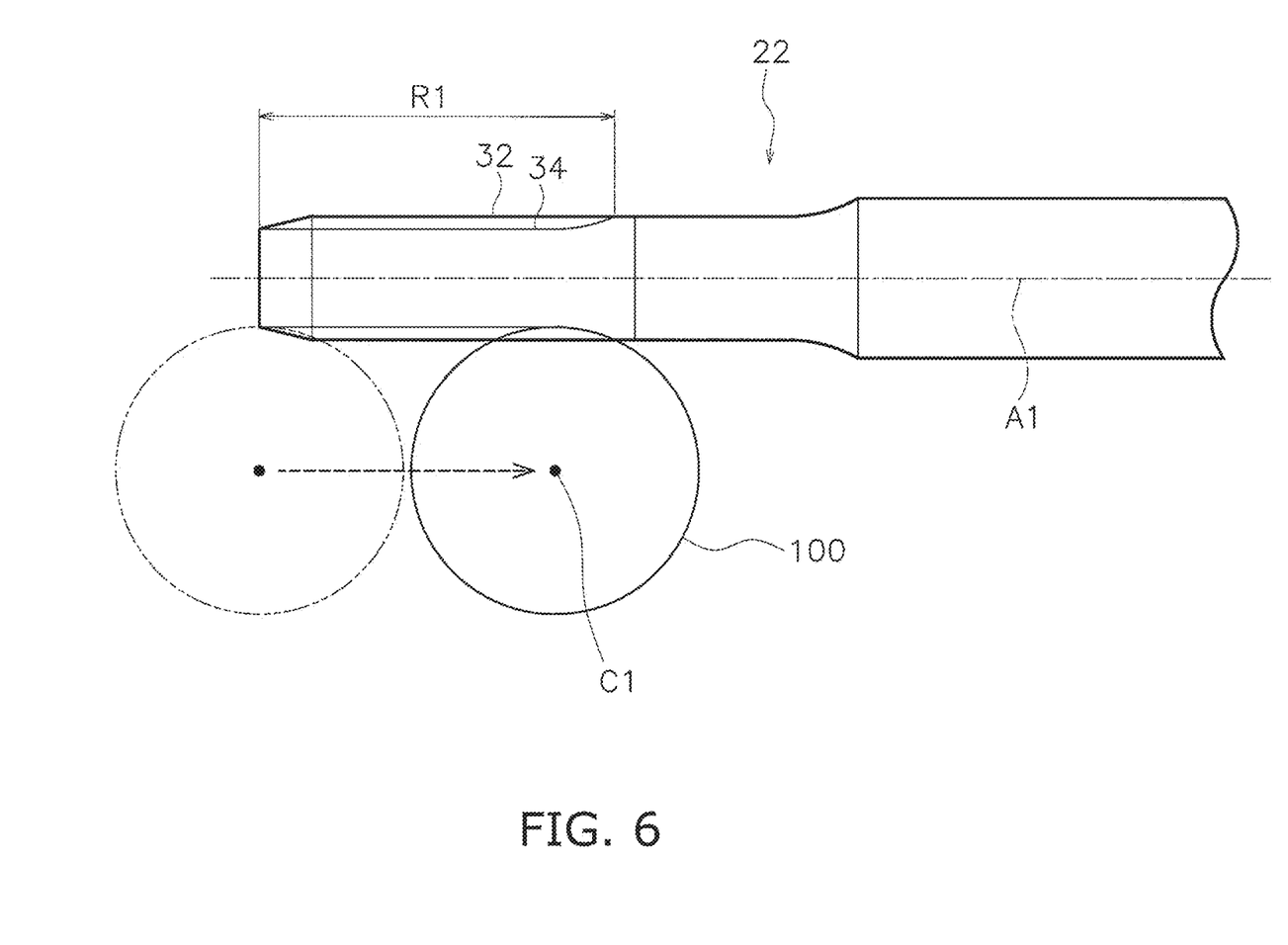
FIG. 6 is a diagram showing a method of manufacturing the second shaft.
Figure 7:
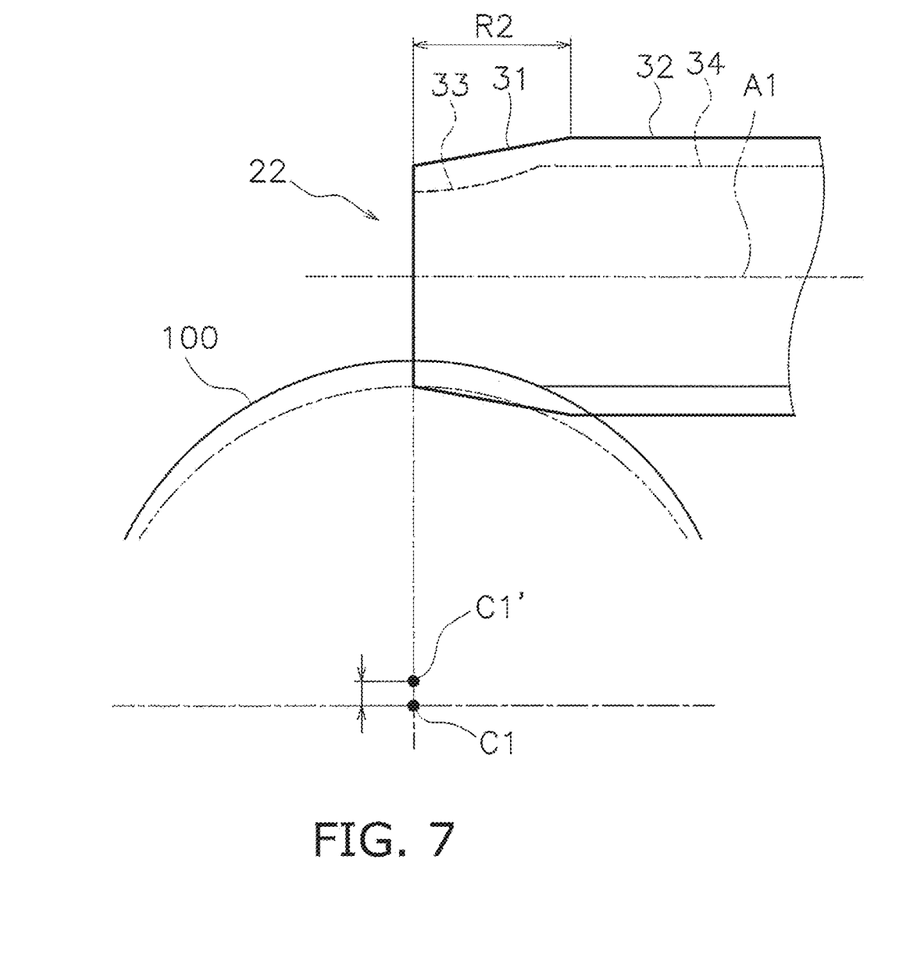
FIG. 7 is a diagram showing the method of manufacturing the second shaft.

FIGS. 6 and 7 are diagrams for showing a method of manufacturing the second shaft 22. First, as shown in FIG. 6, a first process is performed for an end portion of the second shaft 22. In the first process, the second shaft 22 is cut along a predetermined first range R1 from the end portion thereof by a bobbing machine in the axis (A1) direction of the second shaft 22 such that the body 32 of the second spline 24 is formed on the second shaft 22. More specifically, the second shaft 22 is rotated about the axis A1 thereof, and simultaneously, a hobbing cutter 100 of the hobbing machine is moved in the axis (A1) direction of the second shaft 22 while being rotated about a rotational center C1 thereof.

After the first process, a second process is performed on the end portion of the second shaft 22 as shown in FIG. 7. It should be noted that the end portion of the second shaft 22 is chamfered before the first process.

In the second process, the second shaft 22 is cut along a predetermined second range R2 from the end portion thereof in the axis (A1) direction of the second shaft 22 by the hobbing machine such that the distal end 31 of the second spline 24 is formed on the second shaft 22. The predetermined second range R2 is smaller than the predetermined first range R1 in the axis (A1) direction of the second shaft 22.

More specifically, similarly to the first process, the second shaft 22 is rotated about the axis thereof, and simultaneously, the hobbing cutter 100 of the hobbing machine is moved in the axis (A1) direction of the second shaft 22 while being rotated about the rotational center of the hobbing cutter 100. However, a rotational center C1' of the hobbing cutter 100 in the second process is located closer to the axis A1 of the second shaft 22 than the rotational center C1 of the hobbing cutter 100 in the first process. Accordingly, each groove width of the spline is larger in the circumferential direction in the second process than in the first process. Additionally, the root diameter of each groove of the spline formed in the second process is smaller than the root diameter of each groove of the spline formed in the first process. It should be noted that the hobbing cutter 100 used in the second process may be the same as that used in the first process.

Figure 8:
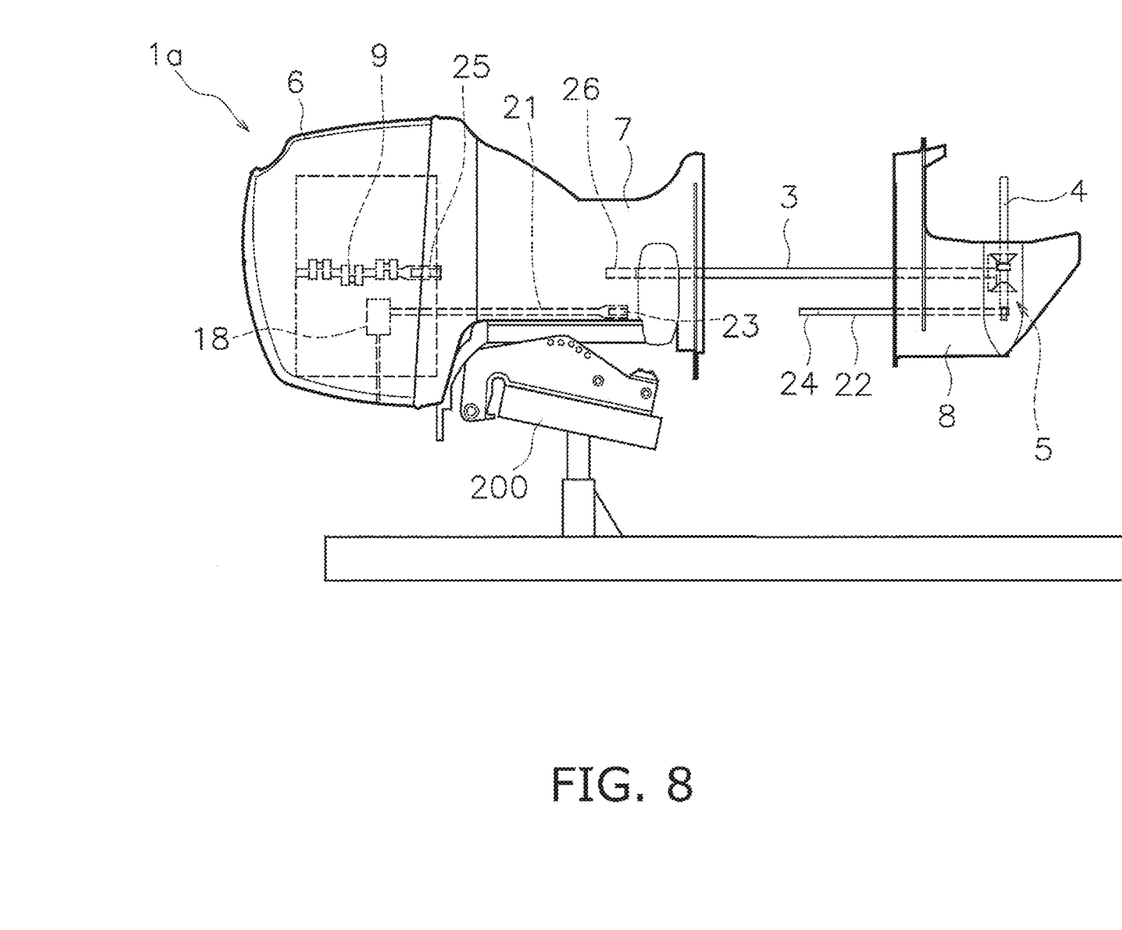
FIG. 8 is a diagram showing a method of assembling the outboard motor.

FIG. 8 is a diagram showing a method of assembling the outboard motor 1. As shown in FIG. 8, for instance, an upper body 1a of the outboard motor 1 is supported by a fixture 200 while being horizontally mounted. The upper body 1a of the outboard motor 1 includes the engine cowl 6, the upper housing 7, the crankshaft 9, and the first shaft 21. The lower housing 8 includes the driveshaft 3 and the second shaft 22. When the lower housing 8 is attached to the upper body 1a of the outboard motor 1, the driveshaft 3 is firstly inserted into the upper housing 7. Then, the fourth spline 26 of the driveshaft 3 is meshed with the third spline 25 of the crankshaft 9. Accordingly, the driveshaft 3 is coupled to the crankshaft 9.

It should be noted that when the fourth spline 26 of the driveshaft 3 is not appropriately meshed with the third spline 25 of the crankshaft 9, the fourth spline 26 is able to be meshed with the third spline 25 by minutely adjusting the position of either the driveshaft 3 or the lower housing 8. After the fourth spline 26 is meshed with the third spline 25, the second spline 24 of the second shaft 22 is meshed with the first spline 23 of the first shaft 21. Accordingly, the second shaft 22 is coupled to the first shaft 21.

In the outboard motor 1 according to the preferred embodiments explained above, in the second spline 24, the circumferential width W1 of each groove 33 provided on the distal end 31 is larger than the circumferential width W2 of each groove 34 provided on the body 32. Additionally, in the second spline 24, the root diameter $\varphi 1$ of each groove 33 provided on the distal end 31 is smaller than the root diameter $\varphi 2$ of each groove 34 provided on the body 32. Because of this, even when the first spline 23 and the second spline 24 are misaligned in position, the second spline 24 is able to be easily meshed at the distal end 31 with the first spline 23. Accordingly, attaching the lower housing 8 to the upper housing 7 is easy. On the other hand, when the second spline 24 is meshed at the body 32 with the first spline 23, wobbling when coupling the first spline 23 and the second spline 24 is reduced to a small amount.

Preferred embodiments of the present invention have been explained above. However, the present invention is not limited to the above-described preferred embodiments, and a variety of changes can be made without departing from the gist of the present invention.

In the above-described preferred embodiments, the second spline 24 is preferably provided on the second shaft 22 of the shift member 17. However, the second spline 24 may be provided on the driveshaft 3. Alternatively, structures similar to the second spline 24 may be provided on both the driveshaft 3 and the second shaft 22 of the shift member 17, respectively.

In the above-described preferred embodiments, the first and second processes are preferably performed by the common hobbing cutter 100. However, the first and second processes may be performed by different hobbing cutters. Alternatively, at least one of the first and second processes may be performed by a cutting machine other than the hobbing cutter 100.

Regarding the order of the processes described above, the second process is preferably performed after the first process is performed. However, the first process may be performed after the second process is performed. Alternatively, the second process and the first process may be simultaneously performed.

In the outboard motor 1, the lower housing 8 may be assembled to the upper body 1a, while the upper body 1a is tilted with respect to the horizontal direction. Alternatively in the outboard motor 1, the lower housing 8 may be assembled to the upper body 1a, while the upper body 1a stands in the vertical direction.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An outboard motor comprising:
    an engine;
    an engine cowl that accommodates the engine;
    an upper housing disposed below the engine cowl;
    a first spline disposed inside the engine cowl or the upper housing;
    a lower housing disposed below the upper housing; and
    a shaft extending upwardly from the lower housing and that includes a second spline meshed with the first spline; wherein
    the second spline includes grooves, a distal end, and a body, the distal end being provided on an upper end of the shaft, and the body being provided below the distal end; and
    in the second spline, a width of the grooves in a circumferential direction at the distal end is larger than a width of the grooves in the circumferential direction along substantially an entire length of the body.

2. The outboard motor according to claim 1, further comprising:
    a driveshaft extending downwardly from the engine;
    a propeller shaft extending in a direction intersecting with the drive shaft; and
    a shift mechanism connected to the driveshaft and the propeller shaft and that switches a direction of rotation transmitted from the driveshaft to the propeller shaft; wherein
    the shaft is connected to the shift mechanism and is configured to actuate the shift mechanism.

3. The outboard motor according to claim 2, wherein the second spline has a smaller fitting length than the driveshaft; and
    the second spline is located below an upper end of the driveshaft.

4. The outboard motor according to claim 1, wherein a radial depth of the grooves at the distal end decreases as the grooves extend downwardly from the upper end of the shaft.

5. The outboard motor according to claim 1, wherein, in the second spline, the width of the grooves in the circumferential direction at the distal end is larger than the width of the grooves in the circumferential direction at the body by about 10% or greater.

6. The outboard motor according to claim 1, wherein
    the engine includes a crankshaft; and
    the shaft is connected to the crankshaft.

7. The outboard motor according to claim 1, further comprising:
    a third spline disposed inside the engine cowl or the upper housing;
    a driveshaft extending upwardly from the lower housing and that includes a fourth spline meshed with the third spline;
    a propeller shaft extending in a direction intersecting with the driveshaft; and
    a shift mechanism connected to the driveshaft and the propeller shaft and that switches a direction of rotation transmitted from the driveshaft to the propeller shaft; wherein
    the shaft is connected to the shift mechanism to actuate the shift mechanism.

8. The outboard motor according to claim 7, wherein the second spline of the shaft has a smaller fitting length than the driveshaft; and
    the second spline is located below the fourth spline of the driveshaft.

9. An outboard motor comprising:
    an engine;
    an engine cowl that accommodates the engine;
    an upper housing disposed below the engine cowl;
    a first spline disposed inside the engine cowl or the upper housing;
    a lower housing disposed below the upper housing; and
    a shaft extending upwardly from the lower housing and that includes a second spline, the second spline being meshed with the first spline; wherein
    the second spline includes a distal end and a body, the distal end being provided on an upper end of the shaft, and the body being provided below the distal end; and
    a root diameter of the second spline at the distal end is smaller than a root diameter of the second spline at the body.

10. A method of manufacturing a shaft for an outboard motor, the method comprising:
    performing a first process of forming grooves in a spline by cutting the shaft along a predetermined first range from an end portion of the shaft in an axial direction of the shaft; and
    performing a second process of cutting the shaft along a predetermined second range smaller than the predetermined first range from the end portion of the shaft in the axial direction of the shaft such that a width of the grooves of the spline is larger in a circumferential direction of the shaft in the second process than in the first process.

11. The method according to claim 10, wherein
    the first process and the second process are performed by a hobbing cutter; and
    the hobbing cutter is located closer to the axis of the shaft in the second process than in the first process.

12. The method according to claim 10, further comprising:
    chamfering the end portion of the shaft before the first process.

13. The method according to claim 10, wherein the first process is performed before the second process.

14. The method according to claim 10, wherein the second process is performed before the first process.

15. The method according to claim 10, wherein the first process and the second process are simultaneously performed.

* * * * *